(12) United States Patent
Yan et al.

(10) Patent No.: US 7,723,670 B1
(45) Date of Patent: May 25, 2010

(54) OPTICAL DIFFERENTIAL GROUP DELAY MODULE WITH FOLDED OPTICAL PATH

(75) Inventors: Lianshan Yan, Sichuan (CN); Xiaojun Chen, San Gabriel, CA (US); Xiaotian Steve Yao, Diamond Bar, CA (US)

(73) Assignee: General Photonics Corporation, Chino, CA (US)

( * ) Notice: Subject to any disclaimer, the term of this patent is extended or adjusted under 35 U.S.C. 154(b) by 0 days.

(21) Appl. No.: 12/055,685

(22) Filed: Mar. 26, 2008

Related U.S. Application Data (60) Provisional application No. 60/908,130, filed on Mar. 26, 2007.

(51) Int. Cl.
G02F 1/01 (2006.01)
(52) U.S. Cl. .................. 250/225; 359/246; 359/251
(58) Field of Classification Search .............. 250/225; 359/124, 156, 246, 251
See application file for complete search history.

(56) References Cited

U.S. PATENT DOCUMENTS

| | | | |
|---|---|---|---|
| 3,302,028 A | 1/1967 | Sterzer | |
| 3,658,405 A | 4/1972 | Pluta | |
| 3,684,350 A | 8/1972 | Wentz | |
| 3,719,414 A | 3/1973 | Wentz | |
| 3,881,823 A | 5/1975 | De Lang et al. | |
| 4,094,581 A | 6/1978 | Baldwin et al. | |
| 4,461,543 A | 7/1984 | McMahon | |
| 4,685,773 A | 8/1987 | Carlsen et al. | |
| 4,798,436 A | 1/1989 | Mortimore | |
| 4,969,720 A | 11/1990 | Lins et al. | |
| 5,206,924 A | 4/1993 | Kersey | |
| 5,251,057 A | 10/1993 | Guerin et al. | |
| 5,305,136 A | 4/1994 | Smith | |
| 5,317,445 A | 5/1994 | DeJule et al. | |
| 5,373,393 A | 12/1994 | DeJule et al. | |
| 5,381,250 A | 1/1995 | Meadows | |
| 5,475,525 A | 12/1995 | Tournois et al. | |
| 5,561,726 A | 10/1996 | Yao | |
| 5,723,856 A | 3/1998 | Yao et al. | |
| 5,751,747 A | 5/1998 | Lutes et al. | |
| 5,777,778 A | 7/1998 | Yao | |
| 5,796,510 A | 8/1998 | Yao | |
| 5,818,626 A | 10/1998 | Engstrom et al. | |
| 5,867,291 A | 2/1999 | Wu et al. | |
| 5,917,179 A | 6/1999 | Yao | |
| 5,929,430 A | 7/1999 | Yao et al. | |
| 5,978,125 A | 11/1999 | Yao | |
| 6,049,415 A | 4/2000 | Grubb et al. | |

(Continued)

OTHER PUBLICATIONS

Dolfi, D., et al., "Two-dimensional optical architecture for time-delay beam forming in a phased-array antenna", *Optics Letters*, 16(4):255-257, Feb. 1991.

(Continued)

*Primary Examiner*—Seung C Sohn
(74) *Attorney, Agent, or Firm*—Fish & Richardson P.C.

(57) ABSTRACT

Differential group delay (DGD) devices and techniques based on folded optical paths. An in-line polarization monitor can be provided as a feedback for worst-case alignment without using an in-line polarizer. Polarization maintaining retro reflectors can minimize the introduced higher-order polarization effects caused by reflections between folding mirrors or prisms in conventional schemes.

20 Claims, 7 Drawing Sheets

U.S. PATENT DOCUMENTS

| | | | |
|---|---|---|---|
| 6,055,081 A | 4/2000 | Koyano et al. | |
| 6,137,574 A | 10/2000 | Hill | |
| 6,154,581 A | 11/2000 | Lu et al. | |
| 6,175,444 B1 | 1/2001 | Toyohara | |
| 6,178,036 B1 | 1/2001 | Yao | |
| 6,243,200 B1 | 6/2001 | Zhou et al. | |
| 6,301,046 B1 | 10/2001 | Tai et al. | |
| 6,337,770 B1 | 1/2002 | Chang et al. | |
| 6,389,197 B1 | 5/2002 | Ilchenko et al. | |
| 6,407,861 B1 | 6/2002 | Zhang et al. | |
| 6,417,948 B1 | 7/2002 | Chowdhury et al. | |
| 6,417,957 B1 | 7/2002 | Yao | |
| 6,473,218 B1 | 10/2002 | Maleki et al. | |
| 6,476,959 B2 | 11/2002 | Yao | |
| 6,480,637 B1 | 11/2002 | Yao | |
| 6,487,014 B2 | 11/2002 | Li | |
| 6,487,233 B2 | 11/2002 | Maleki et al. | |
| 6,487,336 B1 | 11/2002 | Yao | |
| 6,488,861 B2 | 12/2002 | Iltchenko et al. | |
| 6,493,474 B1 | 12/2002 | Yao | |
| 6,498,869 B1 | 12/2002 | Yao | |
| 6,535,328 B2 | 3/2003 | Yao | |
| 6,567,436 B1 | 5/2003 | Yao et al. | |
| 6,570,711 B2 | 5/2003 | Ducellier | |
| 6,574,015 B1 | 6/2003 | Tselikov et al. | |
| 6,576,886 B1 | 6/2003 | Yao | |
| 6,580,532 B1 | 6/2003 | Yao et al. | |
| 6,594,061 B2 | 7/2003 | Huang et al. | |
| 6,628,850 B1 | 9/2003 | Yao | |
| 6,628,861 B1 | 9/2003 | Yao | |
| 6,628,862 B1 | 9/2003 | Yao | |
| 6,643,063 B2 | 11/2003 | Gu | |
| 6,661,941 B1 | 12/2003 | Yao | |
| 6,687,423 B1 | 2/2004 | Yao | |
| 6,693,743 B2 | 2/2004 | Zhao | |
| 6,754,404 B2 | 6/2004 | Yao | |
| 6,795,481 B2 | 9/2004 | Maleki et al. | |
| 6,795,616 B2 | 9/2004 | Yao | |
| 6,836,327 B1 | 12/2004 | Yao | |
| 6,873,631 B2 | 3/2005 | Yao et al. | |
| 6,873,783 B1 | 3/2005 | Yao | |
| RE38,735 E | 5/2005 | Yao | |
| 6,937,798 B1 | 8/2005 | Yao et al. | |
| RE38,809 E | 10/2005 | Yao | |
| 6,975,454 B1 | 12/2005 | Yan et al. | |
| 7,027,198 B2 | 4/2006 | Yao | |
| 7,067,795 B1 | 6/2006 | Yan et al. | |
| 7,154,659 B1 | 12/2006 | Yao | |
| 7,157,687 B1 | 1/2007 | Yao | |
| 7,187,870 B2 | 3/2007 | Ilchenko et al. | |
| 7,218,436 B2 | 5/2007 | Yao | |
| 7,227,686 B1 | 6/2007 | Yan et al. | |
| 7,233,720 B2 | 6/2007 | Yao | |
| 7,265,836 B1 | 9/2007 | Yao | |
| 7,265,837 B1 | 9/2007 | Yao | |
| 7,324,256 B1 | 1/2008 | Sayyah | |
| 7,343,100 B2 | 3/2008 | Yao | |
| 7,372,568 B1 | 5/2008 | Yao | |
| 7,382,962 B1 | 6/2008 | Yao | |
| 7,391,977 B2 | 6/2008 | Yao | |
| 7,436,569 B2 | 10/2008 | Yao et al. | |
| 7,466,471 B2 | 12/2008 | Yao | |
| 7,522,785 B2 | 4/2009 | Yao | |
| 2001/0055154 A1 | 12/2001 | Zhao | |
| 2002/0163691 A1 | 11/2002 | Wong et al. | |
| 2003/0026583 A1 | 2/2003 | Hoyt et al. | |
| 2003/0076588 A1* | 4/2003 | Savory et al. | 359/498 |
| 2003/0081874 A1 | 5/2003 | Yao | |
| 2004/0037495 A1 | 2/2004 | Yao | |
| 2005/0041922 A1 | 2/2005 | Yao | |
| 2005/0168659 A1 | 8/2005 | Melton | |
| 2005/0200941 A1 | 9/2005 | Yao | |
| 2005/0201751 A1 | 9/2005 | Yao | |
| 2005/0265728 A1 | 12/2005 | Yao | |
| 2006/0023987 A1 | 2/2006 | Yao | |
| 2006/0115199 A1 | 6/2006 | Yao | |
| 2007/0223078 A1 | 9/2007 | Yao et al. | |
| 2007/0297054 A1 | 12/2007 | Yao et al. | |
| 2008/0030839 A1 | 2/2008 | Yao | |
| 2008/0054160 A1 | 3/2008 | Yao | |
| 2008/0138070 A1 | 6/2008 | Yan et al. | |
| 2008/0159692 A1 | 7/2008 | Yao | |

OTHER PUBLICATIONS

Goutzoulis, A., et al., "A hardware-compressive fiber-optic true time delay steering system for phased-array antennas", *Microwave Journal*, pp. 126-140, Sep. 1994.

Moslehi, B., et al., "Fiber-optic signal processors with optical gain and reconfigurable weights", *Proc. 4th Biennial Department of Defense Fiber Optics and Photonics Conf.*, McLean, Virginia, pp. 303-309, Mar. 1994.

Ng, W., et a., "Wideband fibre-optic delay network for phased array antenna steering", *Electronics Letters*, 25(21):1456-1457, Oct. 1989.

Norton, D., et al., "Tuneable wideband microwave transversal filter using high dispersive fiber delay lines", *Proc. 4th Biennial Department of Defense Fiber Optics and Photonics Conf.*, McLean, Virginia, pp. 297-301, Mar. 1994.

Riza, N.A., "Transmit/receive time-delay beam-forming optical architecture for phased-array antennas", *Applied Optics*, 30(32):4594-4595, Nov. 1991.

Sobiski, D., et al., "Fast first-order PMD compensation with low insertion loss for 10Gbit/s system," *Electronics Letters*, 37(1):46-48, Jan. 2001.

Soref, R., "Programmable time-delay devices", *Applied Optics*, 23(21):3736-3739, Nov. 1984.

Sullivan, C.T., et al., "Switched time delay elements based on AlGaAs/GaAs optical waveguide technology at 1.32 µm for optically controlled phased array antennas", *Proceedings of SPIE—Optical Technology for Microwave Applications VI and Optoelectronic Signal Processing for Phased-Array Antennas III*, vol. 1703, pp. 264-271, Dec. 1992.

Toughlian, E., et al., "A deformable mirror-based optical beamforming system for phased array antennas", *IEEE Photonics Technology Letters*, 2(6):444-446, Jun. 1990.

Toughlian, E., et al., "A photonic variable RF delay line for phased array antennas", *J. Lightwave Technol.*, 8(12):1824-1828, Dec. 1990.

Yan, L.-S., et al., "Fast Digitally Variable Differential Group Delay Module Using Polarization Switching," *Optical Fiber Communication Conference and Exhibit*, pp. FA5-1-FA5-3, Mar. 2002.

Yan, L.-S., et al., "Programmable Group-Delay Module Using Binary Polarization Switching," *Journal of Lightwave Technology*, 21(7):1676-1684, Jul. 2003.

\* cited by examiner

OPTICAL DIFFERENTIAL GROUP DELAY MODULE WITH FOLDED OPTICAL PATH

PRIORITY CLAIM AND RELATED PATENT APPLICATION

This application claims the benefit of U.S. Provisional Application No. 60/908,130 entitled "Optical Differential Group Delay Module With Folded Optical Path" and filed on Mar. 26, 2007, which is incorporated by reference as part of the specification of this application.

BACKGROUND

This application relates to systems, devices and techniques in connection with optical polarization.

Optical polarization is an important parameter of an optical signal in various optical systems. For example, in fiber optic communication systems, polarization-dependent effects in fibers and other devices, such as polarization-dependent loss (PDL) and polarization-mode dispersion (PMD), can have significant impacts on performance and proper operations of optical devices or systems. Hence, it may be desirable to measure, monitor or control the state of the polarization (SOP) of an optical signal in these and other systems.

Two orthogonal polarization states of an optical signal can experience different delays in an optical material and this difference is known as the differential-group-delay (DGD) of the optical material. DGD modules have various applications, especially the emulation or compensation of polarization mode dispersion (PMD). Various DGD modules are available and some of these DGD modules suffer one or more technical limitations, including (i) modification of the polarization properties of the input light for the worst-case monitoring; (ii) introduction of higher-order PMD when folded optical paths are used; (iii) being relatively bulky in size.

SUMMARY

This application describes implementations of differential group delay (DGD) devices and techniques based on folded optical paths. In one aspect, an optical DGD device includes an input optical port to receive light; an output optical port to output light; polarization maintaining retro-reflectors located relative to the input and output optical ports to form a folded optical path that directs light from the input optical port to the output optical port via the polarization maintaining retro-reflectors; a polarization monitor in the folded optical path to monitor polarization of light; a plurality of polarization rotators in the folded optical path; and a plurality of birefringent elements in the folded optical path and separated by the polarization rotators.

In another aspect, an optical DGD device includes an input and output panel; an input optical port that is located on the input and output panel and receives input light; an output optical port that is located on the input and output panel and outputs light; and a polarization maintaining retro-reflection module that receives light directed from the input optical port along a first optical path and reflects the received light towards the output optical port along a second optical path while maintaining polarization of the received light. The input optical port, the polarization maintaining retro-reflection module, and the output optical port form a folded optical path. This DGD device includes one or more first birefringent elements of varying lengths spatially separated from one another and located in series in the first optical path which directs light from the input optical port to the polarization maintaining retro-reflection module; one or more first optical polarization rotators or polarization controllers placed in the first optical path and spatially interleaved with the one or more first optical birefringent elements so that each first optical polarization rotator or polarization controller is adjacent to at least one first birefringent element and is not adjacent to another first optical polarization rotator or polarization controller; one or more second optical birefringent elements of varying lengths spatially separated from one another and located in series in the second optical path which directs light from the polarization maintaining retro-reflection module to the output optical port; and one or more second optical polarization rotators or polarization controllers placed in the second optical path and spatially interleaved with the one or more second optical birefringent elements so that each second optical polarization rotator or polarization controller is adjacent to at least one second birefringent element and is not adjacent to another second optical polarization rotator or polarization controller. The first and second optical birefringent elements and the first and second optical polarization rotators or polarization controllers produce a variable DGD in the light output at the output optical port.

In yet another aspect, an optical DGD device includes a polarization monitor used for the worst-case alignment, a series of birefringent elements separated with polarization rotators; and a polarization maintaining retro-reflection module to fold the optical path that links the polarization monitor, the birefringent elements and the polarization rotators.

One implementation of the polarization maintaining retro-reflector module includes an input port that receives an optical signal; a first reflection surface to reflect the optical signal; a second reflection surface to reflect the optical signal from the first reflection surface and positioned to be aligned such that the incidence planes of the first and second reflection surfaces are perpendicular to each other with equal angles of incidence; a third reflection surface to reflect the optical signal from the second reflection surface and positioned to be aligned such that the incidence planes of the second and the third reflection surfaces are perpendicular to each other with equal angles of incidence; and a fourth reflection surface to reflect the optical signal from the third reflection surface in an output optical polarization identical to an input optical polarization when the optical signal is incident to the first reflection surface. The fourth reflection surface is aligned so that the incidence planes of the third and the fourth reflection surfaces are perpendicular to each other with equal angles of incidence.

This and other aspects, examples and implementations of techniques and apparatus for PMD emulation are described in detail in the drawings, the description and the claims.

DETAILED DESCRIPTION

Examples provided in this application can be used (i) to provide a simple and effective approach for the worst-case alignment of the input polarized light signal into the differential-group-delay (DGD) module; (ii) to achieve a compact design apparatus for the DGD module using folded optical paths, and more importantly, without introducing any higher-order polarization effects (especially polarization mode dispersion) through light reflections.

Figure 1:
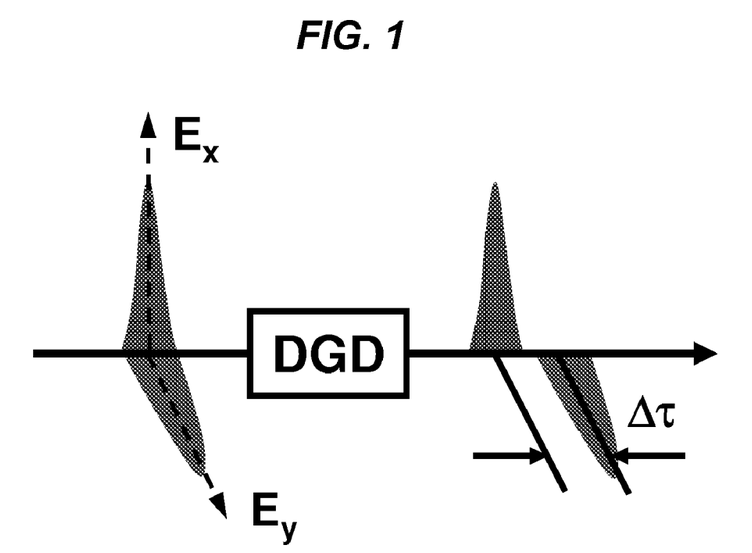
FIG. 1 illustrates the effect of first-order polarization mode dispersion (PMD), i.e., differential-group-delay (DGD), of light when propagating in a birefringent material.

DGD is the first-order effect of PMD, as shown in FIG. 1. The two eigen-modes of the light signal are synchronized at the start of signal transmission but with orthogonal polarization states known as two principal states of polarization (PSPs). After a certain introduced DGD due to optical fiber or components, there will be a relative time delay ($\Delta\tau$) between the two polarization modes, which is DGD. The worst-case of degradation due to DGD corresponds to an equal power splitting between the two principal polarization states. Under this worst-case alignment scenario, a 45-degree linear input polarization state or a circular input polarization state can generate an equal power splitting between two principal polarization states.

In practical applications, one method to guarantee the worst-case alignment is using a polarizer that is aligned at 45-degree between the two PSPs of the DGD module. Through maximizing the output power after the DGD module, the worst-case alignment is achieved. This method has two major problems: (i) possible sudden power jumps during optimization; (ii) the degree-of-polarization (DOP) of the optical signal will be changed (close to 100% through the polarizer).

Figure 2:
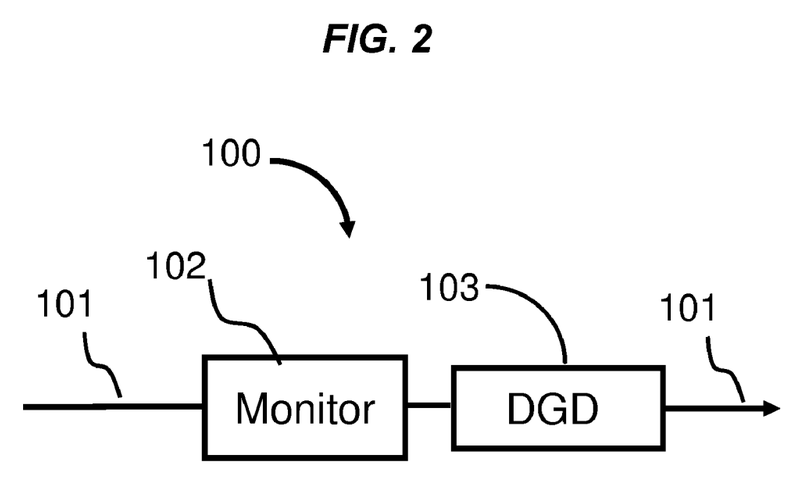
FIG. 2 shows an example of an optical DGD system that can be used for the worst-case alignment into the DGD module.
Figure 3:
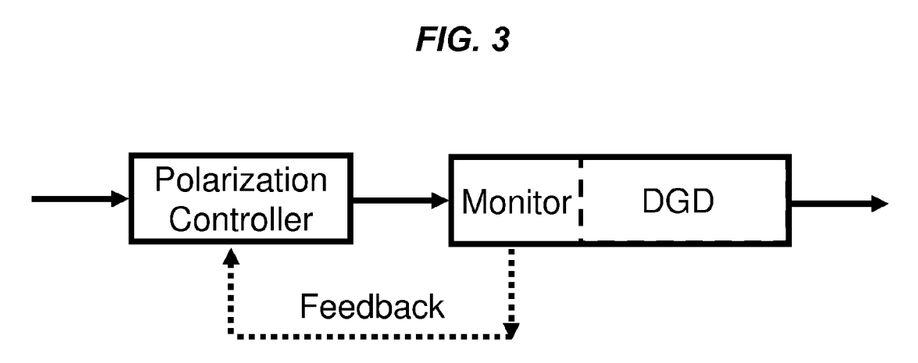
FIG. 3 shows an example an optical DGD system with an automatic alignment or control using a dynamic polarization controller and a DGD with a polarization monitor, where the system can be used as either a first-order PMD emulator or a PMD compensator.

FIG. 2 shows an example of a DGD system 100 for the worst-case alignment into the DGD module. The input fiber 101 of the polarization monitor 102 is used to receive the input light with a certain state of polarization (SOP), the polarization monitor 102 can be used to provide information to align the input SOP to meet the worst-case requirement for the DGD module 103. To be more practical, the monitored information can be used as a feedback signal on a dynamic polarization controller before the monitor 102 and the DGD module 103, as shown in FIG. 3, to achieve the worst-case alignment. This scheme can be widely used in either first-order PMD emulation or PMD compensation.

The polarization monitor 102 can be implemented in various configurations. Several examples are provided in FIGS. 4-7.

Figure 4:
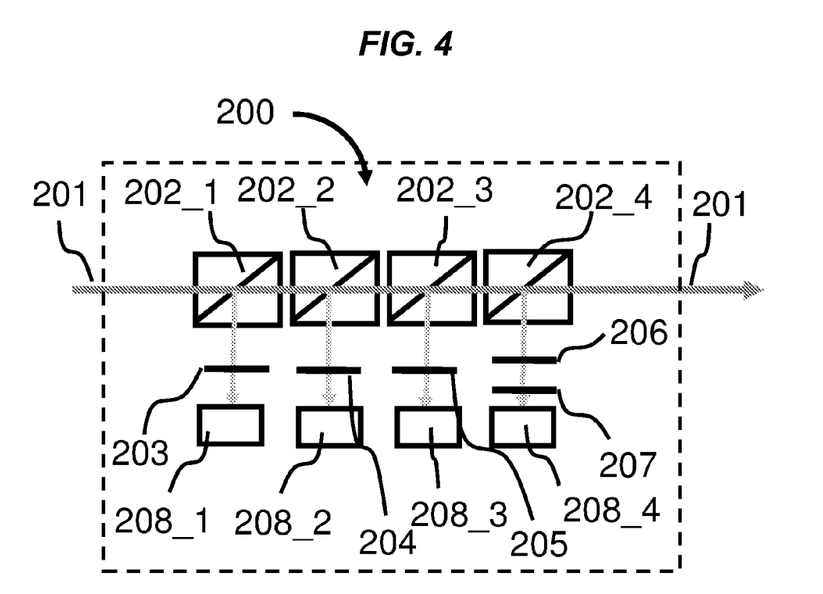
FIG. 4 shows an example of an in-line polarization monitor configuration that can provide the information such as state

FIG. 4 shows an in-line polarization monitor configuration that can provide the information such as SOP and degree-of-polarization (DOP), i.e., an in-line polarimeter. As along as the SOP of the input light is known, the worst-case alignment can be easily achieved through the dynamic polarization controller (FIG. 3), either aligned at a 45-degree linear polarization state or a circular polarization state. The input light coming through the input fiber 201, the monitor (in-line polarimeter) 200 is composed of four partial beam splitters 202_1, 202_2, 202_3 and 202_4. Each beam splitter is used to tap part of the light and detect a certain polarization contribution through inserting different polarization component. As an example, the optical element 203 can be a linear polarizer aligned to 0-degree, the optical element 204 can be a linear polarizer aligned to 90-degree, the optical element 205 can be a linear polarizer aligned to 45-degree, optical elements 206 and 207 can be a quarter-wave ($\lambda/4$) plate and a relative 45-degree linear polarizer, respectively. Four photodetectors 208_1, 208_2, 208_3 and 208_4 are used to detect the power contributions through above polarization components. Through calculating these power levels (or generated voltages), the SOP and DOP information can be obtained and used for the polarization alignment into the DGD module. A partial polarization beam splitter (PBS) may be used as a beam splitter to provide a reference to assist optical alignment.

Figure 5:
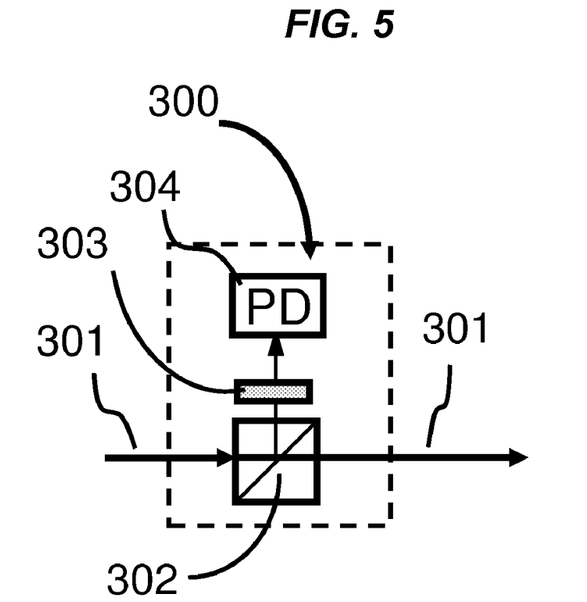
- FIG. 5 shows an example of an in-line polarization monitor that uses a partial beam splitter and a 45-degree polarizer to align the polarization of the input light to a +45-degree or −45-degree linear polarization state.

FIG. 5 shows another polarization monitor example that can be used for the worst-case alignment. The input fiber 301 of the monitor 300 is used to receive input light with a certain SOP. A partial beam splitter 302 can couple part of the optical signal (typically several percent) into the side patch. The coupled light will go through a polarizer 303 and then detected through a photodetector 304. The polarizer is specially aligned relative to the partial beam splitter so that through maximizing the detected optical power using the photodetector, a 45-degree alignment of the input light can be achieved. This configuration is used to align the input SOP to a relative 45-degree linear polarization state into the DGD module.

Figure 6:
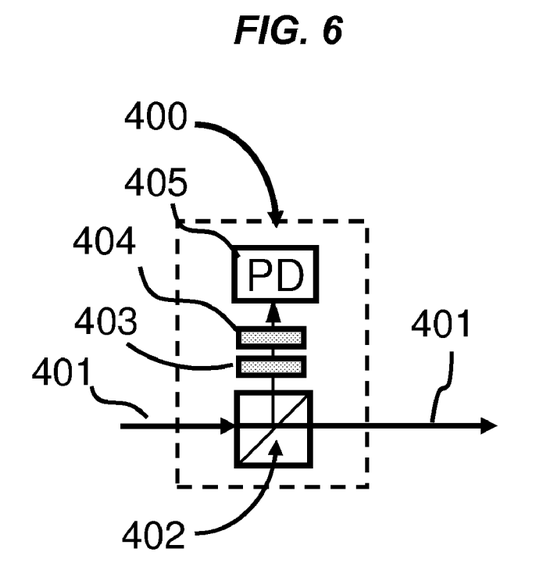
FIG. 6 shows an example of an in-line polarization monitor that uses a partial beam splitter, a quarter waveplate and a +45-degree or −45-degree polarizer to align the polarization of the input light to a circular polarization state.

FIG. 6 shows another example of a polarization monitor that can be used for the worst-case alignment. The input fiber 401 of the monitor 400 is used to receive input light with a certain SOP. A partial beam splitter 402 can couple part of the optical signal (typically several percent) into the side patch. The coupled light will go through a quarter-wave ($\lambda/4$) plate 403 first, and then a relative 45-degree linear polarizer 404. A photodetector 405 is used to monitor the power. Again, a partial PBS can be used as the beam splitter for easy polarization reference and alignment. This configuration can be used to align the input SOP to a circular (either right or left-hand) polarization state into the DGD module, still with the equal power distribution between two eigen or principal polarization modes.

Figure 7:
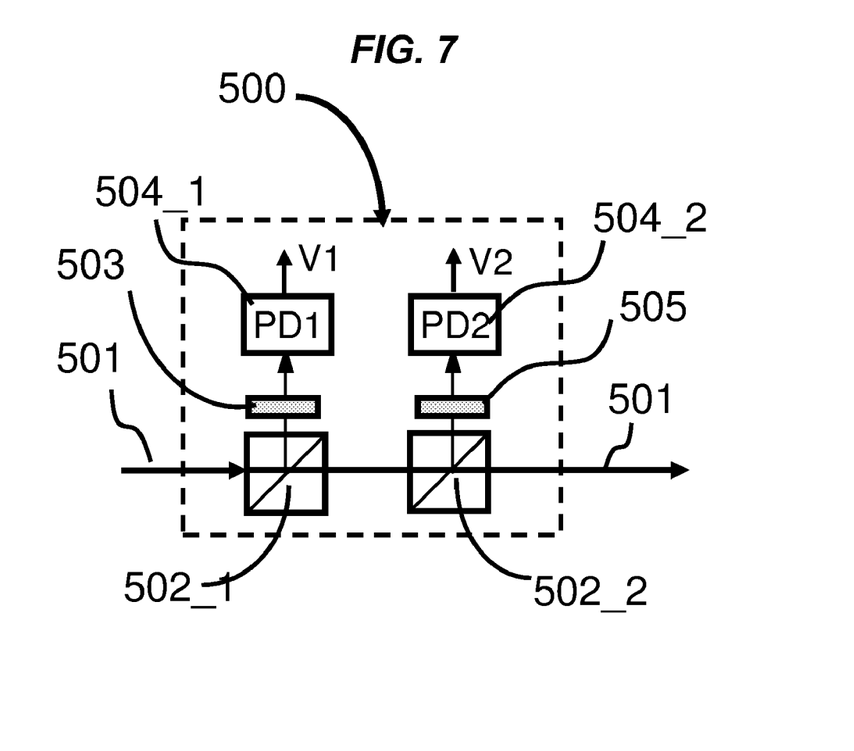
FIG. 7 shows an example of an in-line polarization monitor that balances the detected power contributions from 0-degree and 90-degree linear polarization states to align the polarization state of the input light to the worst case of the DGD module.

FIG. 7 shows yet another example of a polarization monitor configuration 500 that can be used for worst-case alignment. Incoming light 501 will pass two partial beam splitters 502_1 and 502_2. The first coupled light through 502_1 passes through a 0-degree (or 90-degree) linear polarizer 503, and detected by a photodetector 504_1 with output voltage V1; the second coupled light through 502_2 passes through a 90-degree (or 0-degree) linear polarizer 505 and detected by a photodetector 504_2 with output voltage V2. Through balancing (equaling) the detected voltages V1 and V2 (corresponding to optical powers) after easily calibration, the worst-case alignment can be achieved, although the input SOP may be a 45-degree linear polarization or a circular polarization.

Figure 8:
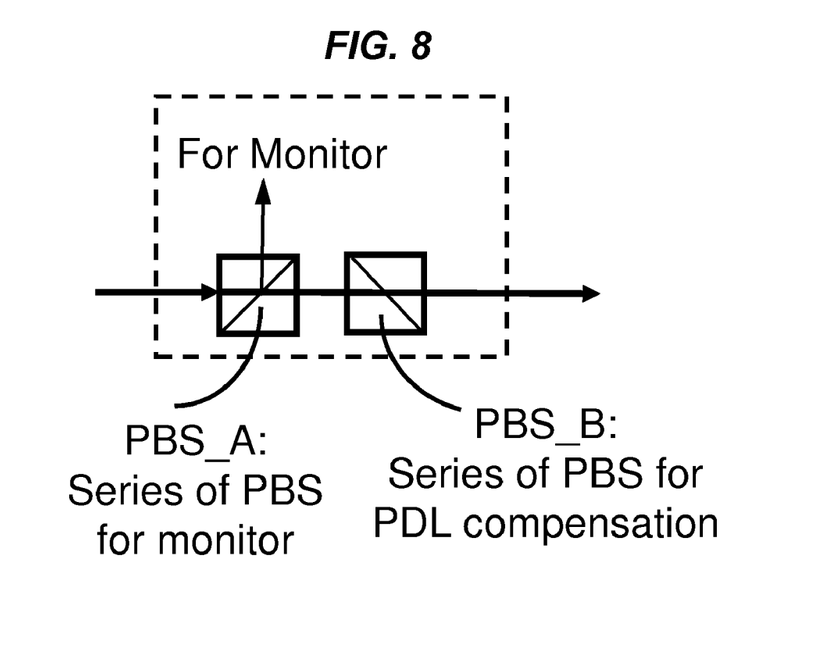
FIG. 8 shows an example of an optical design that provides compensation of polarization dependent loss (PDL) using reversed partial polarization beam splitters (PBS_B) downstream from an identical partial polarization beam splitter (PBS_A) which may be used as part of a polarization monitor.

In above polarization monitor configurations from FIG. 4 to FIG. 7, if the partial PBSs are used instead of regular beam splitters, the partial PBSs may introduce slightly polarization dependent loss (PDL), therefore, other partial PBSs may be incorporated into the main light path to compensate this PDL value though converted orientation and alignment, as shown in FIG. 8.

As more and more components added into the DGD module to provide a tunable DGD module with the monitor function, the size of the module can be significantly increased. A bulky DGD module is not practical for some applications. A folded optical path design can be used to reduce the size of the DGD module without compromising the functionality of the device.

Figure 9:
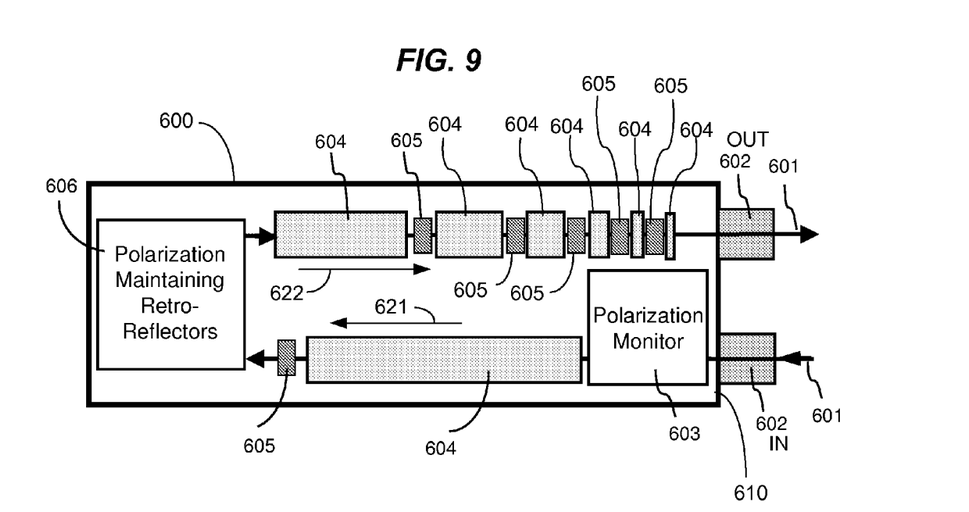
FIG. 9 illustrates an example of an optical DGD system with a folded optical path in a compact design having a DGD module, an in-line polarization monitor, and a polarization maintaining retro-reflection module.

FIG. 9 shows an example of an optical DGD system with a folded optical path in a compact design having a DGD module formed by optical birefringent elements 604 with varying lengths and optical polarization controllers or rotators 605, an in-line polarization monitor 603, and polarization maintaining retro-reflection module 606. The DGD module can be a tunable DGD, examples of which can be found in U.S. Pat. No. 5,978,125 entitled "Compact programmable photonic variable delay devices," which is incorporated by reference as part of this specification of this application. The folded design in FIG. 9 provides a compact DGD package while maintaining the major characteristics of a tunable DGD module.

The optical DGD device in FIG. 9 includes a device housing 600 with an input and output panel 610. An input optical port 602 IN is located on the input and output panel 610 and receives input light 601. An output optical port 602 OUT is also located on the input and output panel 610 and outputs light 601. The polarization maintaining retro-reflection module 606 is positioned inside the housing 600 to receive light directed from the input optical port 602 IN along a first optical path 621 and reflects the received light towards the output optical port 602 OUT along a second optical path 622 while maintaining polarization of the received light. The input optical port 602 IN, the polarization maintaining retro-reflection module 606, and the output optical port 602 OUT form a folded optical path. This DGD device includes one or more first optical birefringent elements 604 of varying lengths spatially separated from one another and located in series in the first optical path 621 which directs light from the input optical port 602 IN to the polarization maintaining retro-reflection module 606 and one or more first optical polarization rotators or polarization controllers 605 placed in the first optical path 621 and spatially interleaved with the one or more first optical birefringent elements 604 so that each first optical polarization rotator or polarization controller 605 is adjacent to at least one first birefringent element 604 and is not adjacent to another first optical polarization rotator or polarization controller 605. The second optical path 622 includes one or more second optical birefringent elements 604 of varying lengths spatially separated from one another and located in series and one or more second optical polarization rotators or polarization controllers 605 spatially interleaved with the one or more second optical birefringent elements 604 so that each second optical polarization rotator or polarization controller 605 is adjacent to at least one second birefringent element 604 and is not adjacent to another second optical polarization rotator or polarization controller 605. The first and second optical birefringent elements 604 and the first and second optical polarization rotators or polarization controllers 605 produce a variable DGD in the light output 601 at the output optical port 602 OUT.

In FIG. 9, the light 601 passes through an optical collimator at the input port 602 IN and enters the DGD module propagating along the free-space light path. The polarization monitor 603 can be the first optical element after the input port 602 IN and is used for worst-case alignment as described in FIG. 4 to FIG. 7. After the monitor, the light travels through a series of birefringent element 604 and polarization rotators or controllers 605, which construct a tunable DGD through adding or subtracting various DGD values. In one implementation, the birefringent element 604 can be configured so that the light passes the birefringent element with the biggest length (corresponding to the biggest DGD value) first to minimize the transient effects during real system applications. The arrangement of the birefringent elements and polarization rotators can be optimized to have a folded path with overall symmetric lengths (upper path and lower path in the figure, including the monitor) for a compact design. Polarization maintaining retro-reflectors can be used in the module 606 to provide the function of the folding path and get rid of the introduced higher-order effects (or polarization variations). After the tunable DGD module, another collimator can be placed at the output port 602 OUT to couple the light into optical fiber for further propagation.

To configure a folded optical path, normally a single prism or two reflection mirrors are used. The prism is a right geometric prism with right-angled triangular end faces (also called Porro prism), the light will reflect on the two end faces through total internal reflection, therefore to alter the direction of the light path. However, there is a problem for such configuration, especially when the polarization of light is taken into account.

Fresnel's laws of reflection precisely describe amplitude and phase relationships between reflected and incident light at a boundary between two dielectric media, the incident radiation can be considered as the superposition of two plane-polarized beams, one with its electric field parallel to the plane of incidence (p-polarized) and the other with its electric field perpendicular to the plane of incidence (s-polarized). During reflection, light wave undergoes a certain phase shift between the s-polarized and p-polarized component, hence the polarization properties of the light (i.e. the superposition of the light) after a single reflection will also be changed. Consequently, in the normal folded optical path using single prism or reflection mirrors, the polarization will not keep the same. A linear polarized light normally will become an elliptical polarized light. When such scheme is applied into a folded DGD path, it will introduce unwanted higher-order effects, which may invalidate the whole module as a DGD generator.

One of methods to solve this problem is to use the polarization maintaining retro-reflectors (PMRR) to replace the conventional folded prisms or mirrors. Several schemes can be used as the PMRR, as shown in FIG. 10 to FIG. 12.

Figure 10:
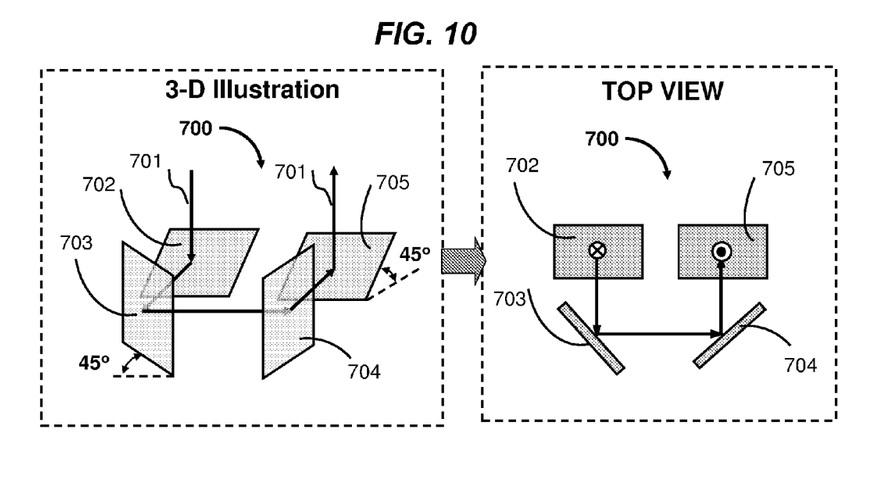
FIG. 10 illustrates an example of polarization maintaining retro-reflectors using reflecting mirrors.

In FIG. 10, the PMRR 700 is composed of several reflection mirrors, the input light 701 will first reflect at mirror 702 at a certain degree (typically 45-degree) to its surface, and then reflect through mirror 703. The incident ray and reflected ray of mirror 702 construct a surface A (i.e. the plane of incidence A); similarly, the incident and reflected ray of mirror 703 construct another surface B. The orientation of mirror 702 and 703 should ensure that surface A and surface B will be perpendicular to each other; and the angles of incidence on both surfaces should be the same, therefore, the p-polarized component in surface A will change to the s-polarized component in surface B, and same to the s-polarized component, and most importantly, the phase shift can be compensated. To fold the light path back, mirror 704 and 705 are used, which have the similar relationship as 702 to 703. Due to the exchange of s-polarized and p-polarized components between surfaces, the phase shift after reflections will be compensated, and the final polarization properties of light 701 after mirror 705 will keep unchanged, i.e. polarization maintained. The offset between the input and output light is used for folding the optical path. The overall structure and orientations of mirrors can be seen from a 3-D illustration and the top view in FIG. 10.

Figure 11A:
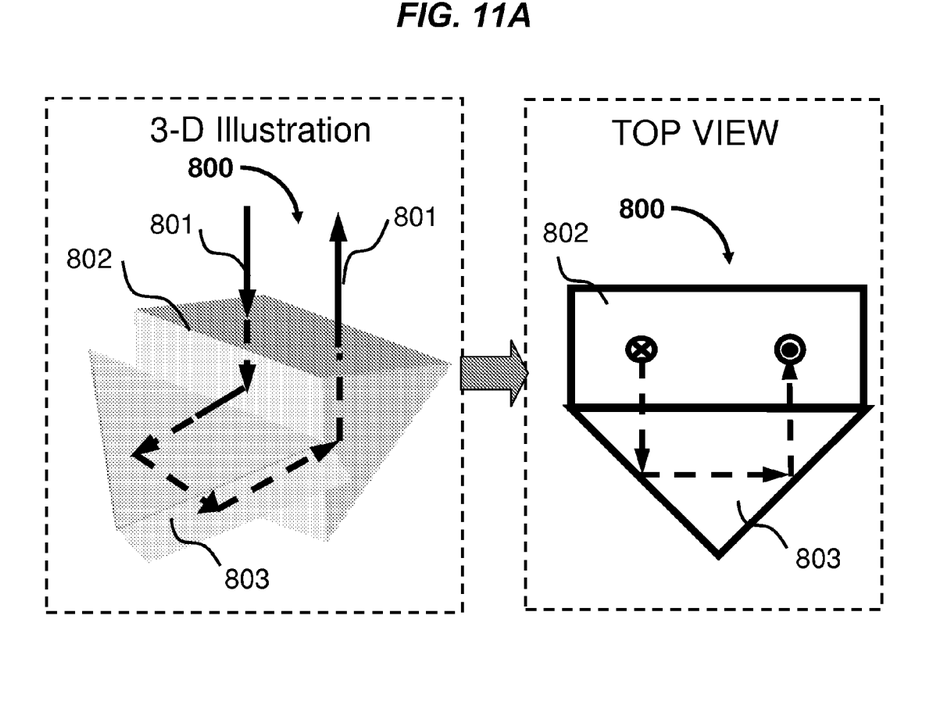
FIG. 11A illustrates an example of a polarization maintaining retro-reflection module made of two reflective prisms based on total internal reflections inside the prisms.
Figure 12:
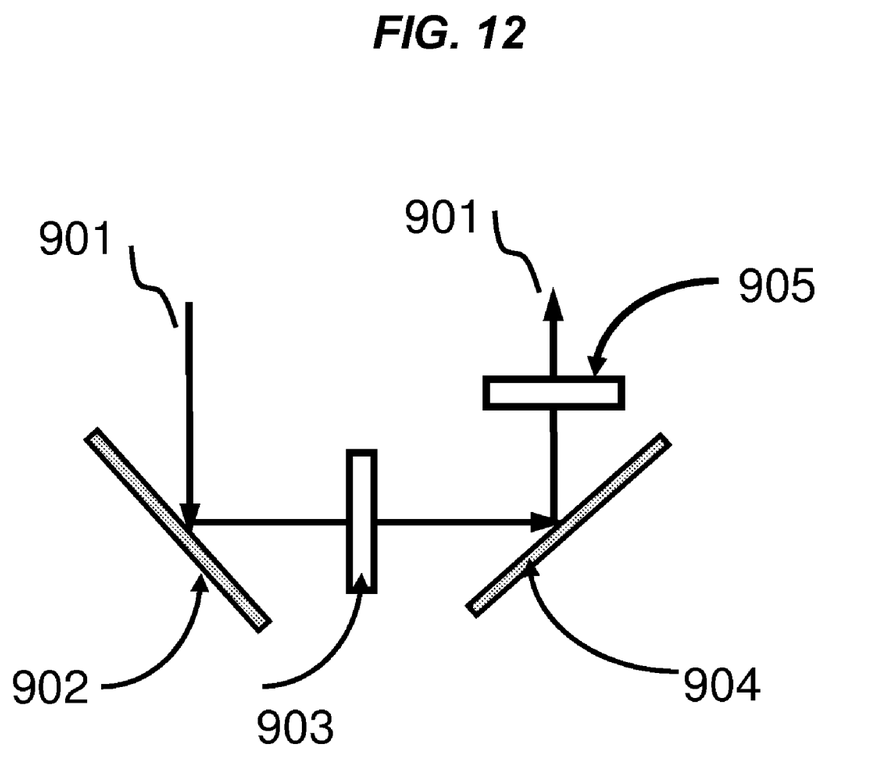
FIG. 12 illustrates an example of two polarization maintaining retro-reflectors using mirrors and polarization rotators.

In FIG. 11A, instead of using reflection mirrors, the PMRR 800 is composed of two right-angle prisms 802 and 803. Following the same principle as PMRR 700, the orientation of the two prisms will ensure the light input/reflection surfaces are different between two prisms (from the TOP VIEW). All the reflections are based on total internal reflection inside the prisms, although the total internal reflection inside 802 happens at the hypotenuse face while the hypotenuse face is used as the entrance and exit face in 803. After all reflections, the light 801 will maintain its original polarization with an space offset for the folding path.

Figure 11B:
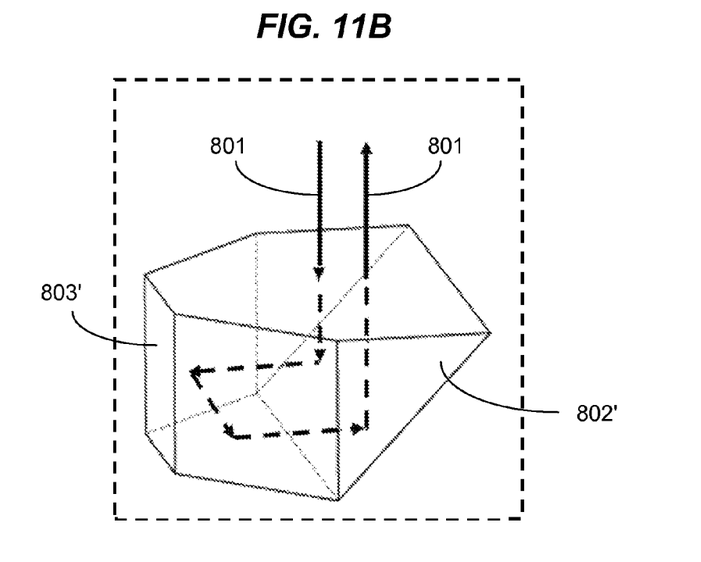
FIG. 11B illustrates an example of a polarization maintaining retro-reflection module made of a single prism module that effectuate the retro-reflection operation of the two reflective prisms in FIG. 11A.

FIG. 11B illustrates an example of a polarization maintaining retro-reflection module made of a single prism module that effectuates the retro-reflection operation of the two reflective prisms 802 and 803 in FIG. 11A. In this example, the prism module includes a first prism portion 802' that corresponds to prism 802 in FIG. 11A and a second prism portion 803' that corresponds to the prism 803 in FIG. 11A.

In FIG. 12, the PMRR scheme is using two mirrors (902 and 904) and two polarization rotators (903 and 905). Assume the input light 901 is a linear polarized light, after the first mirror 902, there will be a phase shift between s-polarized and p-polarized components and the polarization changes to elliptical. The polarization rotator 903 will exchange the s- and p-components. After mirror 904, the phase shift will be compensated and the polarization back to linear again, but with a certain rotation compared to the original, therefore, another polarization rotator 905 is used to change the polarization back to original for the output light 901. Note that, in this scheme, the second polarization rotator (905) may be combined with one polarization rotator used for the tunable DGD generation.

Hence, as illustrated in the examples in FIGS. 10, 11A, 11B and 12, the polarization maintaining retro-reflector module 66 in FIG. 9 can include an input port that receives an optical signal; a first reflection surface to reflect the optical signal; a second reflection surface to reflect the optical signal from the first reflection surface and positioned to be aligned such that the incidence planes of the first and second reflection surfaces are perpendicular to each other with equal angles of incidence; a third reflection surface to reflect the optical signal from the second reflection surface and positioned to be aligned such that the incidence planes of the second and the third reflection surfaces are perpendicular to each other with equal angles of incidence; and a fourth reflection surface to reflect the optical signal from the third reflection surface in an output optical polarization identical to an input optical polarization when the optical signal is incident to the first reflection surface. The fourth reflection surface is aligned so that the incidence planes of the third and the fourth reflection surfaces are perpendicular to each other with equal angles of incidence.

While this specification contains many specifics, these should not be construed as limitations on the scope of an invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or a variation of a subcombination.

Only a few implementations and examples are described, variations and enhancements of the described implementations and examples, and other implementations are possible based on what is described.

What is claimed is:

1. An optical differential group delay (DGD) device, comprising:
   an input optical port to receive light;
   an output optical port to output light;
   polarization maintaining retro-reflectors located relative to the input and output optical ports to form a folded optical path that directs light from the input optical port to the output optical port via the polarization maintaining retro-reflectors;
   a polarization monitor in the folded optical path to monitor polarization of light;
   a plurality of polarization rotators in the folded optical path; and
   a plurality of birefringent elements in the folded optical path and separated by the polarization rotators.

2. The device as in claim 1, wherein the polarization monitor comprises:
   a partial beam splitter to couple part of the input light out of the folded optical path for monitoring the optical polarization;
   a linear polarizer aligned at a relative 45-degree; and
   a photodetector to detect the coupled light after the linear polarizer.

3. The device as in claim 1, wherein the polarization monitor comprises:
   four partial beam splitters to couple part of the input light into four different paths out of the folded optical path;
   a 0-degree polarizer in one path of the coupled light output;
   a 90-degree polarizer in one path of the coupled light output;
   a relative 45-degree polarizer in one path of the coupled light output;
   a quarter waveplate followed by a relative 45-degree polarizer in one path of the coupled light output; and four photodetectors that are respectively located in the four paths to detect optical power after a respective polarizer or waveplate.

4. The device as in claim 1, wherein the polarization monitor comprises:
a partial beam splitter to couple part of the input light out of the folded optical path;
a quarter waveplate to receive the coupled light;
a linear polarizer oriented at a 45-degree angle relative to the quarter waveplate to receive light from the quarter waveplate; and
a photodetector to detect the coupled light after the linear polarizer.

5. The device as in claim 1, wherein the polarization monitor comprises:
two partial beam splitters to couple part of the input light out of the folded optical path into first and second different optical paths,
wherein the first optical path comprises:
a 0-degree linear polarizer to receive the coupled light from a respective partial beam splitter, and
a photodetector to detect light after the linear polarizer; and
wherein the second optical path comprises:
a 90-degree linear polarizer to receive light from a respective partial beam splitter, and
a photodetector to detect light after the linear polarizer.

6. The device as in claim 1, wherein the birefringent elements and rotators are arranged to maximize the symmetry of the folded optical path in terms of path length.

7. The device as in claim 1, the polarization maintaining retro-reflectors comprise:
a first mirror to reflect received light;
a second mirror with a plane of incidence perpendicular to a plane of incidence of the first mirror to reflect the light from the first mirror;
a third mirror to reflect the light from the second mirror; and
a fourth mirror with a plane of incidence perpendicular to a plane of the incidence of the third mirror to reflect the light from the third mirror and change a polarization of the reflected back to a polarization of the light initially incident the first mirror.

8. The device as in claim 1, the polarization maintaining retro-reflectors comprise:
a first prism having a hypotenuse facet to reflect incident light received by the first prism; and
a second prism having a hypotenuse facet oriented at 45 degrees to the hypotenuse facet of the first prism to reflect light from the first prism through its two legs back to the hypotenuse facet of the first prism.

9. The device as in claim 1, the polarization maintaining retro-reflectors comprise:
a first reflection mirror to reflect an input signal;
a first polarization rotator to rotate the reflected light;
a second reflection mirror to reflect the rotated light; and
a second polarization rotator to rotate the reflected light after the second mirror and change the polarization back to original.

10. The device as in claim 9, wherein the second polarization rotator is shared with one of the polarization rotators for DGD generation.

11. The device as in claim 1, the polarization maintaining retro-reflectors comprise:
a first reflection surface to reflect an input optical signal;
a second reflection surface to reflect the optical signal from the first reflection surface and positioned to be aligned such that the incidence planes of the first and second reflection surfaces are perpendicular to each other with equal angles of incidence;
a third reflection surface to reflect the optical signal from the second reflection surface and positioned to be aligned such that the incidence planes of the second and the third reflection surfaces are perpendicular to each other with equal angles of incidence; and
a fourth reflection surface to reflect the optical signal from the third reflection surface in an output optical polarization identical to an input optical polarization when the optical signal is incident to the first reflection surface, wherein the fourth reflection surface is aligned so that the incidence planes of the third and the fourth reflection surfaces are perpendicular to each other with equal angles of incidence.

12. An optical differential group delay (DGD) device, comprising:
an input and output panel;
an input optical port that is located on the input and output panel and receives input light;
an output optical port that is located on the input and output panel and outputs light;
a polarization maintaining retro-reflection module that receives light directed from the input optical port along a first optical path and reflects the received light towards the output optical port along a second optical path while maintaining polarization of the received light, wherein the input optical port, the polarization maintaining retro-reflection module, and the output optical port form a folded optical path;
one or more first optical birefringent elements of varying lengths spatially separated from one another and located in series in the first optical path which directs light from the input optical port to the polarization maintaining retro-reflection module;
one or more first optical polarization rotators or polarization controllers placed in the first optical path and spatially interleaved with the one or more first optical birefringent elements so that each first optical polarization rotator or polarization controller is adjacent to at least one first birefringent element and is not adjacent to another first optical polarization rotator or polarization controller;
one or more second optical birefringent elements of varying lengths spatially separated from one another and located in series in the second optical path which directs light from the polarization maintaining retro-reflection module to the output optical port; and
one or more second optical polarization rotators or polarization controllers placed in the second optical path and spatially interleaved with the one or more second optical birefringent elements so that each second optical polarization rotator or polarization controller is adjacent to at least one second birefringent element and is not adjacent to another second optical polarization rotator or polarization controller, wherein the first and second optical birefringent elements and the first and second optical polarization rotators or polarization controllers produce a variable DGD in the light output at the output optical port.

13. The device as in claim 12, comprising a polarization monitor device placed in one of the first and second optical paths to monitor a polarization of light.

14. The device as in claim 13, comprising a feedback control that uses a monitored signal from the polarization monitor device to control the first and second optical birefringent elements and the first and second optical polarization rotators or polarization controllers.

15. The device as in claim 12, wherein the polarization maintaining retro-reflection module comprises:
    a first reflection surface to reflect an input optical signal;
    a second reflection surface to reflect the optical signal from the first reflection surface and positioned to be aligned such that the incidence planes of the first and second reflection surfaces are perpendicular to each other with equal angles of incidence;
    a third reflection surface to reflect the optical signal from the second reflection surface and positioned to be aligned such that the incidence planes of the second and the third reflection surfaces are perpendicular to each other with equal angles of incidence; and
    a fourth reflection surface to reflect the optical signal from the third reflection surface in an output optical polarization identical to an input optical polarization when the optical signal is incident to the first reflection surface, wherein the fourth reflection surface is aligned so that the incidence planes of the third and the fourth reflection surfaces are perpendicular to each other with equal angles of incidence.

16. The device as in claim 15, wherein the polarization maintaining retro-reflection module comprises a first prism that supports the first and second reflection surfaces and a second prism that supports the third and fourth reflection surfaces.

17. The device as in claim 12, the polarization maintaining retro-reflection module comprises:
    a first reflection mirror to reflect an input signal;
    a first polarization rotator to rotate the reflected light;
    a second reflection mirror to reflect the rotated light; and
    a second polarization rotator to rotate the reflected light after the second mirror and change the polarization back to original.

18. The device as in claim 12, wherein the one or more first birefringent elements in the first optical path of the folded optical path are arranged to place a selected first birefringent element having a DGD value greater than a DGD value of any other birefringent elements closer to the input optical port than any other birefringent elements so that the input light enters the selected first birefringent element first before entering other birefringent elements.

19. The device as in claim 1, wherein the birefringent elements in the folded optical path are arranged to place a first birefringent element having a DGD value greater than a DGD value of any other birefringent elements closer to the input optical port than any other birefringent elements.

20. An optical differential group delay (DGD) device, comprising:
    a housing comprising an input and output panel;
    an input optical port formed on the input and output panel to receive input light;
    an output optical port formed on the input and output panel to export output light;
    a first optical path located inside the housing and having a first receiving end linked to the input optical port to receive the received input light and a first output end;
    a second optical path located inside the housing and having a second receiving end and a second output end linked to the to the output optical port, the second optical path spatially overlapping with at least a portion of the first optical path;
    a polarization maintaining retro-reflection module that is optically coupled to the first output end of the first optical path to receive light from the first optical path and is optically coupled to the second receiving end of the second optical path to direct light from the first optical path into the second optical path while maintaining polarization of the light, wherein the input optical port, the first optical path, the polarization maintaining retro-reflection module, the second optical path and the output optical port form a folded optical path;
    a plurality of optical birefringent elements of varying lengths spatially separated from one another and located in series in the first and second optical paths inside the housing, the birefringent elements including a first birefringent element having a DGD value greater than a DGD value of any other birefringent elements and the first birefringent element located closer to the input optical port than any other birefringent elements;
    one or more optical polarization rotators or polarization controllers placed in the first and second optical paths inside the housing and spatially interleaved with the optical birefringent elements so that each optical polarization rotator or polarization controller is adjacent to at least one birefringent element and is not adjacent to another optical polarization rotator or polarization controller, wherein the optical birefringent elements and the optical polarization rotators or polarization controllers collectively produce a variable DGD in the light output at the output optical port.

* * * * *

UNITED STATES PATENT AND TRADEMARK OFFICE
CERTIFICATE OF CORRECTION

| | | |
|---|---|---|
| PATENT NO. | : 7,723,670 B1 | |
| APPLICATION NO. | : 12/055685 | |
| DATED | : May 25, 2010 | |
| INVENTOR(S) | : Yan et al. | |

It is certified that error appears in the above-identified patent and that said Letters Patent is hereby corrected as shown below:

On Page 2, in Field (56), under "OTHER PUBLICATIONS", in Column 2, Line 8, please delete "a.," and insert -- al., --, therefor.

In Column 7, Line 35, please delete "an" and insert -- a --, therefor.

In Column 12, Lines 14-15, in Claim 20, after "linked" please delete "to the".

Signed and Sealed this
Third Day of May, 2011

David J. Kappos
*Director of the United States Patent and Trademark Office*